Aug. 11, 1964     E. W. ELLIOTT ETAL     3,143,950
CASSETTE MECHANISM
Filed March 30, 1961     3 Sheets-Sheet 1

INVENTORS:
Eugene W. Elliott
and Kenneth E. Schaefer,

BY Louis Bernat
ATTORNEY.

Aug. 11, 1964 E. W. ELLIOTT ETAL 3,143,950
CASSETTE MECHANISM
Filed March 30, 1961 3 Sheets-Sheet 2

INVENTORS:
Eugene W. Elliott
and Kenneth E. Schaefer,
BY Louis Bernat
ATTORNEY.

Aug. 11, 1964  E. W. ELLIOTT ETAL  3,143,950
CASSETTE MECHANISM
Filed March 30, 1961  3 Sheets-Sheet 3

INVENTORS:
Eugene W. Elliott
and Kenneth E. Schaefer,
BY Louis Bernat
ATTORNEY.

3,143,950
CASSETTE MECHANISM
Eugene W. Elliott, Barrington, Ill., and Kenneth E. Schaefer, Bristol, Wis., assignors to Chicago Aerial Industries, Inc., Barrington, Ill., a corporation of Delaware
Filed Mar. 30, 1961, Ser. No. 99,495
12 Claims. (Cl. 95—89)

This invention relates generally to film supply and film take-up mechanisms, and more particularly to improvements in self-powered and self-controlled film cassettes for high cycle rate cameras.

Present day high cycle rate cameras and particularly those used for aerial photography and employing non-perforated film suffer seriously from the large inertia effects of their film supply and take-up spools. These inertia effects can cause errors in the amount of film metered for each successive cycle of the camera. Commonly, in aerial cameras, a metering roller working in conjunction with a pressure roller provides the only drive source for pulling the photographic film across the exposure area from a supply spool. The supply spool is usually equipped with a friction brake to assist in overcoming inertia effects occurring when the heavy spool is suddenly rotated. After passing the metering and pressure rollers, the film is passed through a suitable light lock into a film take-up cassette driven by the camera mechanism through an over-running clutch.

Under high cycle rate conditions it is necessary that the film be accelerated and rapidly moved across the exposure area. Under these conditions, it has been found that the friction grip exerted on the film by the pressure roller against the metering roller is not sufficient to avoid slippage, with concurrent errors in the metered amount of film. To assist in overcoming this condition of slippage at the metering roller, the film in most contemporary cameras, is wrapped under tension around a substantially 270° segment of the metering roller, so that friction in this area will assist the friction between the pressure roller and metering roller during the interval in which film is being accelerated. However, even with these provisions, under the influence of high cycle rates, with the concomitant large inertia effects of the film supply and take-up spools, the spools are normally unable to maintain an adequate and substantially unvarying tension on the film at the metering roller. As a result of the varying tension, slack is developed in the film with a loop developing around the metering roller. This results in slippage of the film when it is rapidly accelerated. The resulting metering error incurred at high cycle rates has formed the principal barrier to higher cycle rates.

Modern roll film cameras employing five inch wide film in 100 foot lengths and operating in pulse mode normally are limited to maximum cycle rates of approximately 2 cycles per second. Naturally with wider film and more footage, the problem is magnified and the pulse mode cycle rates are limited to much lower rates because of increased metering errors. At the same time, because of the increasing effectiveness of anti-aircraft devices, it has become a desirable and common practice to fly reconnaisance missions at relatively low altitudes, on the order of 500 to 1500 feet. As aircraft speeds increase in these altitude regions, it is becoming increasingly necessary to improve the pulse mode cycle rates of cameras beyond that currently available so that they may continue to provide the overlap required for stereo coverage.

To obtain the higher cycle rates required for present and future missions, many solutions to the metering roller slippage problem have been proposed. Most frequently these solutions have been mere design refinements and have taken the shape, in one form or another, of a spring loaded idler roller in an additional film loop, or refinements to the braking of the supply spool or the drive of the take-up spool. These refinements to the supply spool brake or the take-up spool drive, or the addition of spring loaded idler rollers, have commonly failed to reach a completely satisfactory solution because of the extreme variations in film speeds encountered in the modern multi-purpose aerial camera. These multi-purpose cameras are capable of and frequently do utilize remote selection of their various modes of operation. These modes, varying from simple serial frame pulse exposures to rapid cycling exposures employing continuous image motion compensation, result in film speed variations from a low of approximately 0.15 inch per second to a high of over 30 inches per second. At the same time that speed variations are occurring, it is necessary to maintain a rate accuracy of 95% or better to avoid blurred exposures due to faulty image motion compensation. Because of these extreme speed variations involving a dynamic ratio in excess of 200 to 1, the prior art devices designed to maintain adequate tension on the film have apparently nearly reached their ultimate limits of performance improvement.

It is therefore a general object of this invention to provide new and improved film supply and take-up mechanisms which overcome the limitations of the prior art devices.

More specifically, it is one object of this invention to provide a self-powered film supply or take-up mechanism capable of providing or accepting film at widely varying rates of feed while constantly maintaining a predetermined tension on the film.

It is another object of this invention to provide a self-powered film supply or take-up mechanism that is self-controlled.

Still another object of this invention is to provide a film supply or take-up mechanism capable of responding to extreme rate changes in film speed while maintaining substantially constant tension on the film.

It is a more particular object of this invention to provide a new film supply or take-up mechanism capable of responding smoothly to extreme changes in film rate and which will not introduce error in the image motion compensating drive of any attached camera or cause a film jerk or sudden motion during the exposure interval.

In accordance with a specific illustrative embodiment of the invention, these and other objects are attained in a novel film supply or take-up mechanism incorporated in film cassettes employing a self-contained servo system whereby the photographic film supplied by the cassette or received by the cassette from an attached camera body is maintained under substantially constant tension regardless of film rate. A feature of the invention is the use of a cassette contained prime mover operating completely independent of the camera body prime mover and capable of controlling the film supply or take-up velocity by means of servo mechanisms. Thus in one aspect of this invention, precise control of film velocity in the supply or take-up cassette is achieved utilizing a prime mover that is completely independent of the prime mover controlling film metering velocity. This unique arrangement is very effective since the camera body prime mover is relieved of the load normally imposed by the film take-up mechanism.

In another feature of the invention, the position of a spring loaded idler roller in an additional film loop interior of the film cassette is used to control the velocity of the film spool. Thus, the film in the cassette is moved at a velocity corresponding to the velocity of the film past the metering rollers. Since the spring providing the load on the idler roller in the additional film loop in the cassette can be made quite linear in its effects over a small region of travel, the film being supplied to the cassette by the camera, or to the camera by the cassette, is maintained under substantially constant tension. To insure the spring loaded idler rollers operation in an area of constant tension, it is another feature of the invention that the servo response is made an exponential function analogous to a one cycle log function in order to accommodate the approximately 200 to 1 dynamic ratio of film velocity that may be encountered. Thus the response rate of the servo system for slow film speeds to or from the cassette is made quite low while the response rate to high film feeds is made very high.

Still another feature of the invention, is the use of irreversible drive gearing combined with spool inertia absorbing means as a complementary feature to the exponential response of the servo system. This results in the load, in this case the supply or take-up spool, following the exponential response curve of the servo system during periods of either increasing or decreasing size of the additional film loop. This is accomplished in the supply or take-up mechanism of the invention without upsetting or imposing an overload on the electrical portion of the servo control loop.

In describing the operation of the cassettes of the invention, the following explanation is directed to the take-up cassette of the invention, it being understood that the operation of the supply cassette is almost identical as will appear from further description appearing hereinbelow. The output of exposed film from the camera causes a loop increase in the take-up cassette, which tends to change the position of the spring loaded idler roller. The change in the position of the idler roller results in the movement of the arm of a special function device, such as a potentiometer or differential transformer, which causes an increased output from a magnetic drive amplifier. The increased amplifier output causes the drive motor to increase in speed and through irreversible reduction gears and a high torque mechanical slip clutch to drive the take-up spool with increasing speed. As film continues to be fed from the camera, the take-up spool is driven at a rate to maintain a particular loop size for the given film velocity. When the film output of the camera is interrupted or stopped, the loop is quickly reduced, causing a change in the position of the arm of the function potentiometer to effect a reduced output from the magnetic amplifier. As the amplifier output is decreased, the motor speed is reduced without any significant energy feedback from the take-up spool to the motor because of the slip clutch and the irreversible transmission gear. At a preadjusted point, corresponding to some minimum loop size that still allows for additional idler roller travel, a switch is opened to terminate the supply of power to the drive motor and at the same time to close a low-resistance path to electrically short the motor armature. The shorting of the motor armature results in the motor stopping in approximately 3 revolutions. Here the irreversible drive gearing comes into play, channeling the energy of the film spool into the high torque film drive clutch where it is rapidly dissipated. If the spool energy were not dissipated rapidly, the spool continuing to turn would wind up the film remaining in the loop around the idler roller resulting in a jerk being imparted to film in the camera.

Because of the extremely smooth operating characteristics achieved by the above noted features of the inventive cassettes, the mechanism of these cassettes is peculiarly adapted to continuous or intermittent rapid processing of exposed film using the web technique. In the web technique of rapid processing, one or more carrier webs or strips of material coated or saturated with the various processing chemicals is brought into contact with the exposed film to deposit the chemicals thereon. Generally, the chemicals are monobath because of the increased mechanical simplicity possible in the processor with fewer webs. The chemicals may be in the form of a sol, gel, emulsion or liquid and remain compatible with the inventive concept.

The smooth operating characteristics of the inventive cassette mechanism are necessary or at least highly desirable when employing the web techniques in a processor principally because of the low wet strengths of the available carrier web materials. Although it might appear that web materials with a high wet strength could be selected to overcome the need for smooth operating characteristics in the processor, a combination of other factors to be considered in the selection of the web material generally has militated against such a selection.

Some of the factors to be considered and compromised with respect to each other in the choice of the webbing material are: opening size (if any); woven; non-woven or molded fabrics; thickness; wet strength; and absorbency. It has been found that for most applications employing liquid monobaths or other liquid chemicals that the web, when saturated, should be capable of supporting about three pounds across its width, should be capable of absorbing or adsorbing on the order of six or more times its own weight, and should be capable of carrying 10 cc. or more of the processing liquid per square foot of material. Among the various materials available, a preferred form generally filling the above requirements is a fiber glass non-woven fabric with a binder consisting of a polyacrylic or polyvinyl alcohol and with a filament size on the order of three microns. Unfortunately, such a material has a relatively low wet strength and is torn by any jerking action it sustains. While it might appear that this tendency to tearing could be alleviated by laminating the web material to an inert plastic of higher strength, it has been found that air bubbles formed in the fibers of laminated webs are almost impossible to remove with any presently known techniques and result in discontinuities in the developing action.

In utilizing the web technique with the inventive cassette, the exposed film from the camera is continuously processed by sandwiching it with a web material that has been impregnated with a monobath developing solution. When sandwiched with the film, the monobath impregnated web gives up the required amount of solution to fully develop the film to yield a negative which may be viewed directly, scanned electronically, or washed and dried in the usual manner of film negative finishing.

The rapid processing attachment herein disclosed provides the support and control required for a roll of monobath developer saturated web and provides for a uniform sandwiching of the exposed film and the saturated web under all camera operating conditions. The master take-up spool winds up the saturated web thereby producing a roll of processed film. The rapid processing attachment also provides a controlled temperature environment in order that the optimum chemical reaction may be achieved. These features of the rapid processing attachment are achieved by combining certain mechanical and electrical elements with a modified take-up cassette as described further hereinbelow. Because of the inherent suitability of the inventive mechanism to the web technique of rapid procesisng it is a fundamental object of this invention to provide a film take-up mechanism compatible with the monobath impregnated web techniques of continuously processing exposed film.

Yet another object of this invention is to provide a self-powered, self-contained rapid processing attachment compatible with existing types of multi-mode operation aerial photographic cameras.

With these and other objects and features in view, the invention consists in the construction, arrangement and combination of the various parts of the film supply or take-up mechanism wherby the objects contemplated are attained as hereinafter set forth. The various features of novelty are pointed out with particularity in the claims appended to and forming a part of this specification. For a better understanding of the invention and its advantages, reference is had to the accompanying drawing and descriptive matter in which are illustrated and described illustrative embodiments of the invention.

Figures 1, 2, 3, 4:
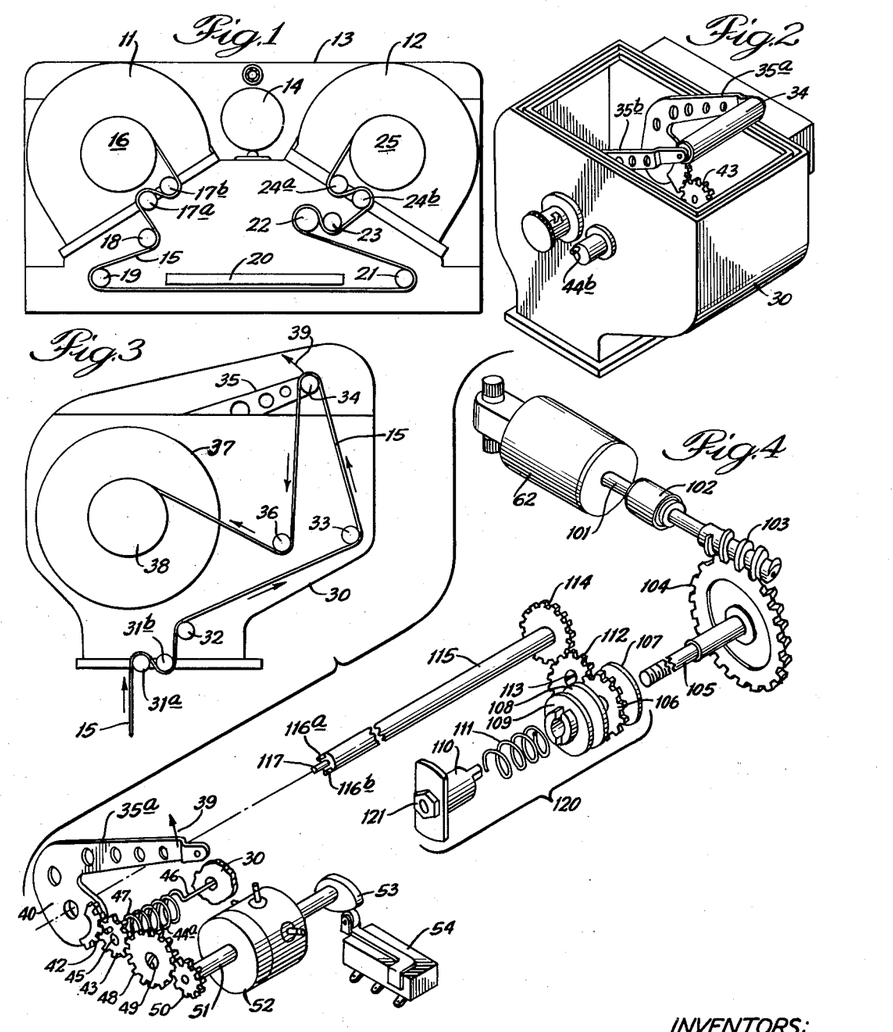
FIGURE 1 is a schematic diagram illustrating the film path and metering roller position in a contemporary aerial camera.
FIGURE 2 is a perspective view of the film take-up cassette of the invention with its cover and film spool removed.
FIGURE 3 is a schematic diagram illustrating the film path in the take-up cassette of the invention.
FIGURE 4 is a perspective view partially exploded showing the cassette mechanism.

Referring now in detail to the drawings and specifically to FIGURE 1, the film path from supply to take-up cassettes in a representative contemporary aerial camera is illustrated. The camera body 13 supports two removable cassettes 11 and 12, which respectively may be designated supply and take-up. The film 15 is unwound from supply spool 16 and passes through a light lock comprised of rollers 17a and 17b into the camera body. The film then is moved past idler rollers 18 and 19 and a platen 20 to idler roller 21. From idler roller 21 the film is wrapped around a substantially 270° segment of metering roller 22 and passes between the metering roller and pressure roller 23. From the pressure roller 23, the film is passed through the light lock comprised of rollers 24a and 24b, to the take-up spool 25 located in the take-up cassette 12. It can readily be seen that any relaxing or substantial diminution in the tension maintained on the film 15, by either the supply spool 16 or the take-up spool 25, would result in a loss of peripheral contact of the film with the metering roller 22. As hereinabove set forth, such a loss of peripheral contact results in metering errors which become very substantial at high film speeds under conditions of intermittent operation.

Since the supply and take-up cassettes of the invention are nearly identical, the invention will be described in terms of the take-up cassette and the differences between the take-up and supply cassette pointed out further hereinbelow. FIGURES 2 and 3 illustrate the take-up cassette of the invention and the film path through the cassette, respectively.

The film 15 enters the cassette 30 through a light lock comprised of rollers 31a and 31b. The film is then threaded past idler rollers 32 and 33 and over a sensing roller 34 which is supported by spring loaded arms 35a and 35b. After looping over sensing roller 34, the film is threaded around idler roller 36 to film spool 37, around whose core 38 the film is wrapped. Since the arms 35a and 35b supporting sensing roller 34 are spring loaded for rotation about their pivot ends in the direction of arrow 39, an output of exposed film from the camera or movement of the film 15 in the direction of the arrows super-imposed in FIGURE 3 will cause an increase in the size of the loop bounded by rollers 33, 34 and 36. Changes in loop size are sensed by a control potentiometer associated with a sensing roller support arm and are used to signal the servo system of the invention to increase the re-wind speed of take-up spool 37 to decrease loop size. An illustrative embodiment of the loop sensing and servo drive mechanism in accordance with the principles of the invention is illustrated in FIGURE 4.

Sensing roller support arm 35a terminates in a generally annular portion 40 adapted to rotate around a hub, not herein illustrated. Secured to annular portion 40, as by pinning or any other suitable fastening method, is an arcuate gear segment 42. Gear segment 42 meshes with spring bias gear 43. Gear 43 is secured to a shaft 45 rotatably mounted in cassette frame 30. A torsion spring 44a, chosen for its flat spring characteristics is positioned around shaft 45. One termination 46 of spring 44a is fixedly secured to the cassette frame while the other termination 47 engages spring bias gear 43. Since shaft 45 with gear 43 attached thereto is free to rotate in the cassette frame, spring 44a supplies a bias force tending to rotate sensing roller support arm 35a in the direction of arrow 39. Sensing roller support arm 35b, not shown in FIGURE 4, is spring biased for rotation in an identical manner to arm 35a.

Figure 5:
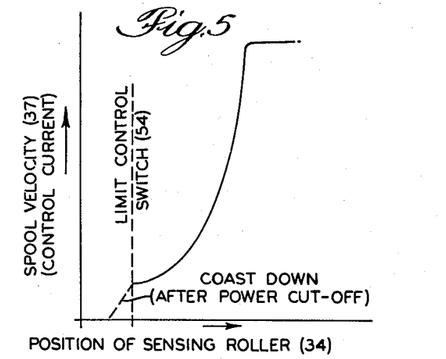
FIGURE 5 is a plot of sensing roller position versus film spool velocity.

Idler gear 48, rotatably mounted on stub shaft 49, meshes with bias gear 43 and with pinion gear 50 secured to the shaft 51 of control potentiometer 52. Also secured to the potentiometer shaft 51 is a cam 53 designed to actuate a switch 54 upon rotation of arm 35a to a particular preselected position. The purpose and operation of switch 54 are brought out further hereinbelow. From the foregoing and a consideration of FIGURE 4, it is readily apparent that changes in the position of arm 35a are reflected by changes in the position of potentiometer shaft 51. Changes in the position of the potentiometer shaft result in a variation in the output control voltage to the servo motor system to affect speed variations in the take-up spool in accordance with the response curve of FIGURE 5.

Those skilled in the art will readily appreciate that other control means responsive to the movement of arm 35 may be used in lieu of potentiometer 52 with equally advantageous results. For example, a rotary or linear differential transformer with suitable characteristics may be employed or in some cases a radiant energy sensing device such as a photoelectric or ultrasonic sensor may be utilized to sense the position of the roller support arm assuming other corresponding changes are made in the electrical circuitry of the invention.

It is a special feature of the invention that the servo response of the system is made to follow an approximately exponential curve. This is especially advantageous because of the extreme range of speed possible in the film supplied to the cassette. Thus, for film being supplied to the cassette at very low speeds, on the order of 0.15 inch per second, the response of the servo system is made quite low, resulting in low speed, but continuous operation of the take-up spool. This low speed operation maintains the loop over sensing roller 34 small, so that in the event of high speed transients in the film feed rate, the sensing roller will have sufficient time to signal the servo system before reaching its maximum limit of travel. Since, as a result of the exponential control function, small changes in the position of sensing roller 34, except in the region of a small loop, cause large variations in the servo system response rate, high speed transients even when superimposed on high speed operation are prevented from substantially changing film tension.

Changes in the output control voltage of potentiometer 52 result in a change in the average level of the current supplied to the D.C. servo motor 62 of the invention. The shaft 101 of servo motor 62 is coupled to worm 103 by means of a flexible coupling 102 of any suitable type. Worm 103 engages worm gear 104 with the reduction ratio between the two being sufficiently high to provide irreversible operation. While worm gearing has been employed to prevent reversible operation in the devices illustratively disclosed, it will be apparent to those skilled in the mechanical arts that other well-known techniques for achieving this result may be utilized. One such alternate technique would be the substitution of a clutch and a brake for the worm gearing assembly.

Step shaft 105 secured to gear 104 provides the center pivot for conventional slip clutch 120. Assembled over shaft 105 are discs of friction material 107 and 108 with a gear 106 assembled therebetween. Neither friction discs 107 or 108, or gear 106 are secured to shaft 105. A compression spring 111 compressed between hubs 110 and shoe 109 maintains the required friction characteristics between friction discs 107 and 108 and gear 106. Hex nut 121 threadedly engaged with step shaft 105 serves to adjust the tension of compression spring 111 to the desired level.

Idler gear 112, rotatably mounted on a stub shaft 113, meshes with clutch gear 106 and a spool drive gear 114 secured to shaft 115. A reduced diameter portion 117 of shaft 115 in combination with pins 116a and 116b engages the spool drive slot of a standard film take-up spool. Since the worm reduction gearing is irreversible, whenever motor 62 decelerates or stops, the energy of the relatively heavy film spool is absorbed in the slip clutch 120.

Figure 6:
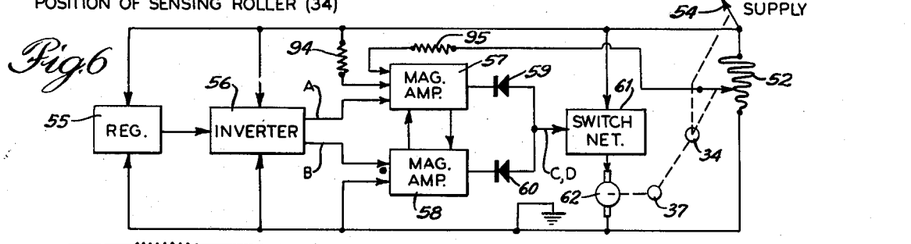
FIGURE 6 is a block diagram of the electrical circuitry of the invention and FIGURE 7 illustrates the various wave-shapes occurring at various portions of the circuitry of FIGURE 6.
Figure 7:
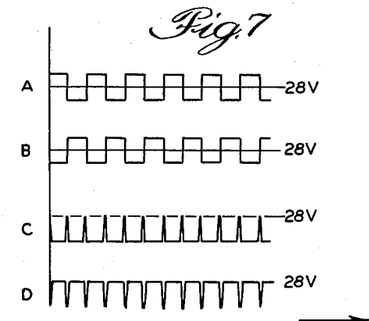
Figure 8:
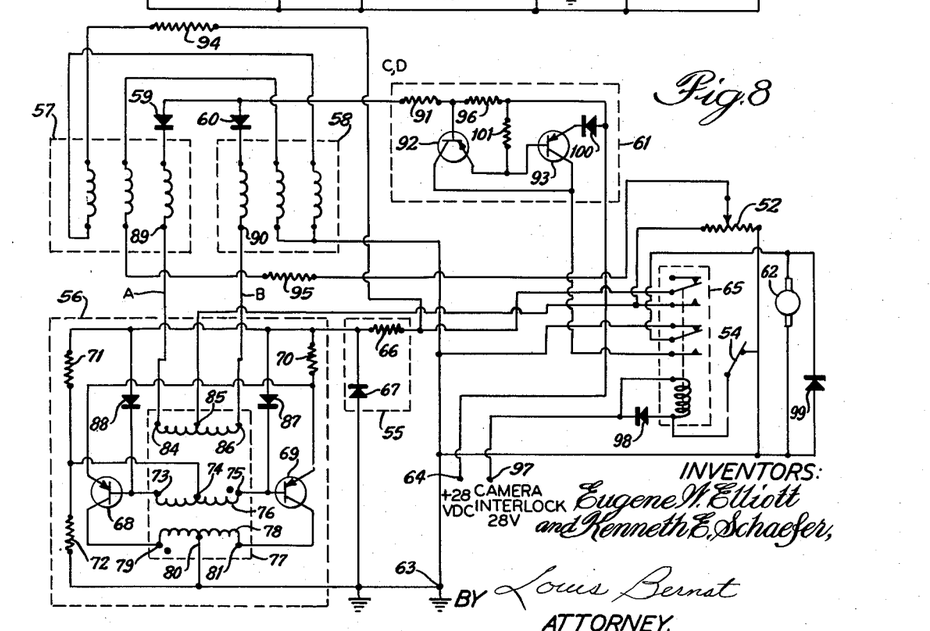
FIGURE 8 is a schematic diagram of the electrical circuitry of the invention.

FIGURE 6 illustrates in block diagram form an illustrative servo system of the invention, with FIGURE 7 being a graphical diagram of the voltages which occur at various times and positions within the circuitry of FIGURE 6. Time increases from left to right in FIGURE 7 and the letters A, B, C, etc., indicate the sequence voltage-time relations occurring at the correspondingly lettered positions within the circuitry of FIGURE 6.

In accordance with the principles of the invention, the film spool drive motor is advantageously controlled by constant amplitude, constant frequency, current pulses whose width varies as a function of the control voltage transmitted by control potentiometer 52. This is accomplished in the servo system of the invention wherein the aircraft D.C. supply is connected to a regulating circuit 55 which removes any undesirable fluctuations present in the aircraft supply. The output of the regulating circuit 55 is utilized as a bias supply for an inverter 56. Inverter 56 has two outputs, each a square wave 180° out of phase with respect to the other and oscillating about the aircraft D.C. supply level. The frequency of the two inverter output square waves, A and B respectively, establishes the maximum pulse width supplied to the servo motor of the invention.

Each of the inverter output square waves is fed to a separate magnetic amplifier 57 or 58. Each of the magnetic amplifiers 57 or 58 has three windings thereon. The three windings are respectively a bias winding, a control winding in opposition to the bias winding, and a signal winding to which the square wave output of inverter 56 is connected. The control current for the series connected bias windings of magnetic amplifiers 57 and 58, is fixed by resistor 94 which is in turn connected to the unregulated aircraft D.C. supply. The current for the series connected control windings of magnetic amplifiers 57 and 58 is determined by resistor 95 connected to the wiper of non-linear control potentiometer 52. Control potentiometer 52 is in turn connected across the unregulated aircraft D.C. supply and ground.

Depending upon the control voltage supply to resistor 95 by potentiometer 52, the pulse width at the output of each of the magnetic amplifiers 57 and 58 is varied. Because of diodes 59 and 60 in the output circuit of each of the magnetic amplifiers, the combined output signal C to switching network 61 is essentially a full wave rectified D.C. wave train comprised of pulses of varying width, but of substantially constant frequency and amplitude.

The magnetic amplifier output wave train C is used to control a transistor switching network 61 which, in turn, supplies the current pulses to D.C. servo motor 62. Because of the inertia effects of the mechanical components of the system and the self inductance of motor 62, the current pulses supplied the motor are integrated to result in the motor operating at a speed proportional to pulse width and hence the control potentiometer setting. It is a special feature of this invention that the control pulse width, and therefore the motor speed, may be varied in accordance with the position of sensing roller 34 to follow the curve of FIGURE 5, for both acceleration and deceleration conditions. Servo motor 62 connected to film spool 37 by means of the non-reversible gear train explained hereinabove, serves to reposition the arm of control potentiometer 52 to maintain a loop in film 15 whose size is a function of the output film speed of the attached camera. Whenever the size of the film loop reaches a predetermined minimum, switch 54 is opened cutting off all power to the servo motor. Conversely if film loop size increases beyond a predetermined minimum, switch 54 is closed and film spool speed regulated in accordance with the position of sensing roller 34. So that the operation of the electrical circuitry of the invention can more readily be understood, reference is now taken to FIGURES 8, 9, 10 and 11 and the following description.

The unregulated aircraft D.C. power, which most frequently is 28 volts, is supplied at terminals 63 and 64 and is passed through relay contacts 65 to regulator 55 and inverter 56. The regulator regulates the 28 volt supply to 15 volts by means of dropping resistor 66 and zener diode 67 connected to ground.

The emitters of two PNP transistors 68 and 69 are connected to the regulated supply through resistor 70 whose purpose is brought out further hereinbelow. Forward bias to both transistors 68 and 69 is provided through winding 76 on a toroidal core saturating inductor 77. Winding 76 is supplied by a connection to regulator 55 made from the center point of a voltage dividing network consisting of resistors 71, 72 and connected to its center terminal 74. Winding 76 has the base of transistor 68 connected to its terminal 73 and the base of transistor 69 connected to its terminal 75. The collectors of both transistors are connected to a second winding 78 on the same toroidal core saturating inductor 77. Winding 78 has the collector of transistor connected to its terminal 79, its center terminal 80 connected to ground and the collector of transistor 69 connected to its terminal 81.

Operation of the inverter 56 may best be described by the following example. When power is first supplied to the regulator and inverter, both transistors 68 and 69 begin to conduct, due to the forward bias provided through winding 76 by the dividing network comprised of resistors 71 and 72. However, due to inherent properties of both the transistors and their associated circuitry, both transistors will not begin to conduct at precisely the same speed or rate. If it is assumed that when power is first supplied to the inverter, transistor 69 begins conducting slightly more or sooner than transistor 68, a net magnetic flux will build up in the toroidal core due to the unequal increase of opposing currents in the two windings of coil 78. As indicated by the polarity dots on the coils of FIGURE 8, this changing flux will induce a voltage across coil 76 such that the potential at point 75 is reduced below that at 74, causing transistor 69 to conduct still harder, and the potential at point 73 is raised above that at point 74, causing decreased conduction through transistor 68. This action continues until an equilibrium conduction state for both transistors is reached.

Figures 9, 10, 11:
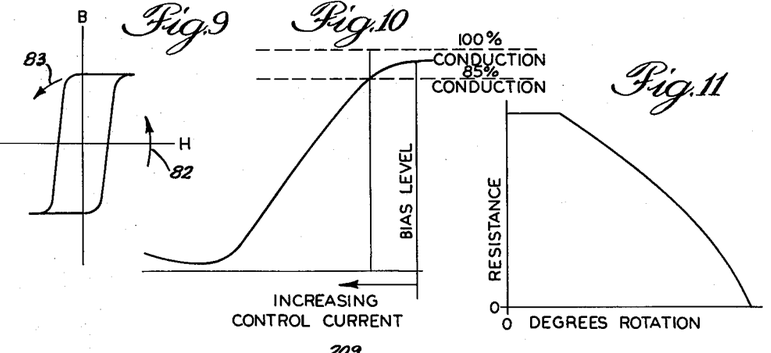
FIGURE 9 is a BH diagram for the toroidal core saturating inductor used in the circuitry of the invention.
FIGURE 10 is a diagram illustrating the characteristics of the magnetic amplifier employed in the circuitry of the invention.
FIGURE 11 is a diagram illustrating the characteristics of the control potentiometer of the invention.

At the equilibrium conduction state for both transistors, the next flux change through the core decreases to zero, and the induced voltage across coil 76 ceases, causing both transistors to return toward the original bias level which exists due to divider resistors 71 and 72 alone. However, as this occurs, a net flux change in the core, opposite to the original flux change, is produced and an E.M.F. is now developed across points 73 and 75 which causes transistor 68 to conduct harder and transistor 69 to tend toward cutoff. It should be noted that the parameters of the inverter circuit elements and the winding polarity connections have been chosen to make the bias changing process highly regenerative in both directions. After one or two half-cycles, the core will pass through alternate positive and negative points of saturation in the direction of arrows 82 and 83 as shown in FIGURE 9. Thus continuance of this oscillation results in a substantially square wave A.C. output at the transformer output terminals 84 and 86.

Silicon diodes 87 and 88 plus resistor 70 function cooperatively as emitter current limiters for both transistors 68 and 69. Since the forward voltage drop of a silicon diode is approximately ½ volt, each diode limits the voltage at the base of its associated transistor to a value of approximately ½ volt less than that of the 15 volt supply, or in other words, limits the forward bias on each transistor to a ½ volt maximum. Also, the maximum current that may be passed by the transistors is limited to this forward voltage drop of silicon diode 87 or 88 divided by the resistance of resistor 70. In one illustrative embodiment, resistor 70 has been 6.8 ohms.

The square wave output appearing across terminals 84 and 86 of inductor 77 is referenced to the 28 volt unregulated D.C. supply by a connection at terminal 85. Thus, the square wave output appears as an A.C. voltage alternating about a 28 volt D.C. level.

The output square wave appearing at terminal 84 of inductor 77 is connected at terminal 89 to the signal winding of magnetic amplifier 57. The square wave output appearing at terminal 86 of inductor 77 is connected at terminal 90 to the signal winding of magnetic amplifier 58. The output of magnetic amplifier 57 is passed by diode 59 and a current limiting resistor 91 to the input of a transistor switching network 61. The output of magnetic amplifier 58 is passed by diode 60 and the same current limiting resistor 91 to the same switching network 61. The operation of the switching network is described further hereinbelow. The two diodes 59 and 60, taken together, comprise a full wave rectifier since the wave forms appearing at the output of magnetic amplifiers 57 and 58 are 180° out-of-phase. Both magnetic amplifiers 57 and 58 are normally biased to substantially full conduction by the current fixed by resistor 94 as indicated in FIGURE 10. The control current being in opposition to the bias current is utilized to turn off the magnetic amplifiers.

It is a feature of this invention that the control current for magnetic amplifiers 57 and 58 determined by resistor 95 is achieved in accordance with the positioning of a non-linear control potentiometer 52 whose resistance characteristics are illustrated in FIGURE 11. The control potentiometer 52 is, in turn, positioned by the gear train in accord with the position of sensing roller 34 which detects the size of the film loop. For a minimum film loop, the control potentiometer is set to its maximum voltage output so as to develop a maximum control current for the magnetic amplifiers across resistor 95. Maximum control currents hold the magnetic amplifiers nearly cut-off so that only a pre-determined minimum of signals from the square wave oscillator will be passed to the switching network. Conversely, for a maximum film loop the voltage output of control potentiometer 52 is at a minimum so that the minimum control current is developed across resistor 95. Minimum control currents result in a full ON condition for the magnetic amplifiers under the influence of the steady state bias current. The rectified output wave form of the magnetic amplifiers for full conduction is shown in FIGURE 7C and for minimum conduction in FIGURE 7D. The resistance characteristics of control potentiometer 52 illustrated in FIGURE 11 were created so that the known operating characteristics of the magnetic amplifiers as illustrated in FIGURE 10 when combined with the overall mechanical response of the servo system would result in the exponential response curve of FIGURE 5.

The negative going voltage pulses C, D appearing at the output of the magnetic amplifiers and applied to the base of transistor 92, forward bias it to conduction. The resulting voltage drop and current flow at its emitter results in forward bias being applied to transistor 93, which in turn begins conduction. Since the collectors of both transistors 92 and 93 are tied together and connected to the motor load 62 through relay 65, very little power is wasted in the switching network other than that required to establish forward bias on transistor 92. Diode 100 in combination with resistors 101 and 96, in a manner well-known to those versed in the electronic arts, serves to stabilize transistors 92 and 93 in the face of elevated temperatures which otherwise might cause the transistors to leak excessively.

A decrease in the size of the film loop below a predetermined minimum results in the opening of switch 54 which, in turn, opens relay 65. Opening of relay 65 opens the power connection to motor 62 from the switching network 61 and opens the circuit connecting the aircraft supply to the bias and control windings of magnetic amplifiers 57 and 58 and the regulator and inverter. Advantageously, the circuit to relay 65 is completed through the film failure interlock of the camera mechanism by a connection at terminal 97. Diode 98 in parallel with the coil of relay 65 dissipates transients that occur whenever the coil is deenergized.

Simultaneously with the opening of relay 65 a conduction path is established through the relay contacts shorting the armature of motor 62 on itself to bring the motor to an extremely rapid halt. Diode 99 establishes a conduction path around motor 62 to prevent damage to the transistors of the switching network from motor developed induced currents when power to the motor is interrupted as it is during the switching operations and when the power to the motor is interrupted by the opening of switch 54.

Figure 12:
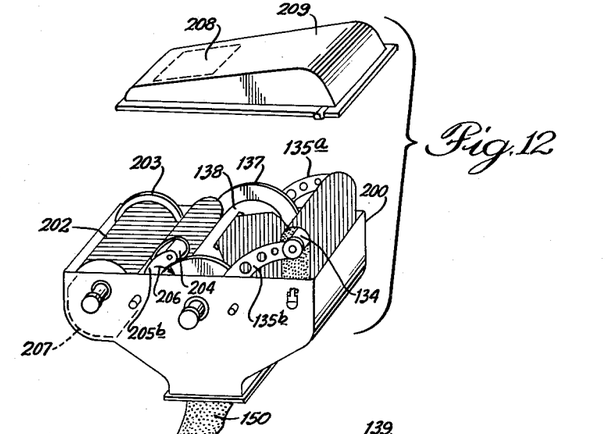
FIGURE 12 is a perspective view with the cover removed of a modified take-up cassette adapted to rapid processing of the exposed film.
Figure 13:
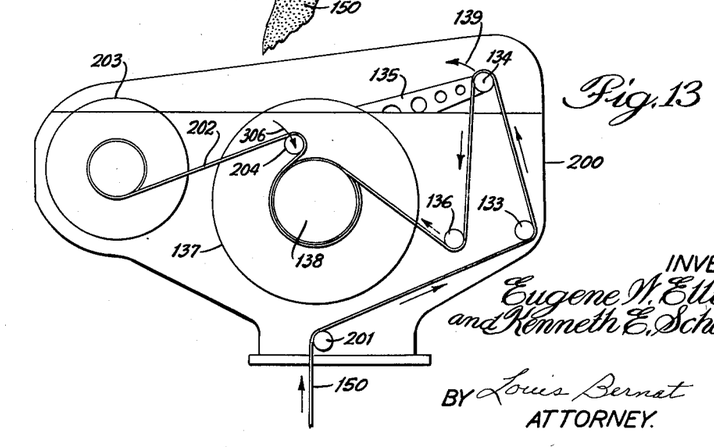
FIGURE 13 is a schematic diagram illustrating the path of exposed film and processing material in the embodiment of FIGURE 12.

As pointed out hereinabove, the inventive cassette mechanism is peculiarly adaptable to a mechanism for rapid processing of photographic film utilizing the web technique. One processor configuration employing the inventive mechanism is a take-up cassette illustrated in FIGURE 12 of the drawing, while FIGURE 13 is a threading diagram illustrating the paths of the exposed film and the monobath saturated web through the processor.

The exposed film 150 from the camera is threaded around idler roller 201 as it enters the rapid processing attachment 200. The film is then threaded past idler roller 133 and over a sensing roller 134 which is supported by sensing roller support arms 135a and 135b, which are spring biased for movement in the direction of arrow 139. After looping over sensing roller 134, the film is threaded around idler roller 136 to film spool 137, around whose core 138 it is wrapped with the emulsion side out. A feature of the invention rapid processing attachment is the operation of sensing roller 134 which senses the amount of film in the loop bounded by idler rollers 133 and 136 in a manner analogous to the operation of sensing roller 34 illustrated in FIGURE 3. Operation of the servo system employed in the rapid processing attachment is identical to that described hereinabove with respect to the take-up cassette illustrated in the earlier figures of the drawing. It should be noted that because the film is to be processed immediately only a rudimentary type of light lock, such as a slit, is required or necessary at the point where the film enters the processing attachment.

A monobath saturated web 202 coiled on a spool 203 is threaded over pressure roller 204 supported by pressure roller support arms 205a and 205b. The pressure roller support arms 205a and 205b are spring biased in the direction of arrow 206 to cause the saturated webbing material to be pressed against spool 137. Because the film 150 is wound on spool 137 with its emulsion side out, the saturated web adheres to the film due to the adhesive forces of the wet film emulsion and due to the capillary action of the processing material between the emulsion and the webbing material. Advantageously, the pressure roller support arms 205a and 205b are individually spring biased in a manner similar to that described above for biasing of sensing roller support arms 35a and 35b, to assure uniform sandwiching action of the web and film and to exclude air bubbles over the wide range of operating speeds encountered.

Because the developing action of the monobath materials employed is greatly affected by temperature, it is desirable to provide a controlled temperature environment in the region of greatest developing efficiency of the particular monobath solution. In the processing attachment of the invention, the controlled temperature environment is achieved by the use of two thermostatically controlled electrical blankets 207 and 208. Blanket 207 is assembled in the processor 200 while blanket 208 is assembled inside of the processor cover 209 in close physical proximity to the processing web 202. Since the construction of the blankets and their thermostatic controls is well known to those versed in the electrical arts and since their construction forms no part of the invention, they are not described further herein.

While in the foregoing description the invention has been described in terms of a take-up cassette, the supply cassette is essentially a mirror image of the take-up cassette. In other words, the spool of the supply cassette would be caused to rotate in an opposite direction to that indicated in FIGURE 3. Also the limit switch 54 and the maximum voltage end of potentiometer 52 would be set to coincide with a maximum rather than a minimum loop. In all other features the supply cassette is identical to the take-up cassette.

Having described only typical forms of the invention, it is not the intent of the inventors to be limited to the specific details herein set forth. Rather, they wish to reserve to themselves any variations of modification that may appear to those skilled in the art and fall within the scope of the following claims.

We claim:

1. In a device for handling photographic film, the combination comprising a film spool, sensing means in contact with the film and capable of controlled movement in either one of two opposite directions for determining the size of a loop in the film approaching said spool, signal generator means associated with said sensing means and responsive to its movement for providing a control signal, said control signal having a characteristic that is a function of the size of said film loop, and intermittently operating, high speed velocity servo means connected to said signal generator means and responsive to said control signal to drive said spool at a rate related by an exponential function to the sensed size of said film loop.

2. In a device for handling photographic film, the combination comprising a film spool, pivotally mounted spring biased sensing roller means in contact with the film and capable of controlled movement in either one of two opposite directions for determining the size of a loop in the film approaching said spool, signal generator means connected to said sensing means and responsive to its movement for propagating a control signal having a characteristic related to the size of said film loop, and intermittently operating, high speed velocity servo means connected to said signal generator means and responsive to said control signal to drive said spool at a rate related by an exponential function to the sensed size of said film loop.

3. In a cassette for supplying or taking up photographic film, the combination comprising a light tight housing, a rotatable film spool positioned in said housing, guide means located in said housing for guiding said film along a path between the exterior of said cassette and said film spool, said film in said path including at least one variable size loop, sensing means in contact with the film and capable of controlled movement in either one of two opposite directions for determining the size of said variable size loop, signal generator means connected to said sensing means and responsive to its movement for propagating a control signal, said control signal having a characteristic related to the size of said film loop, and intermittently operating, high speed velocity servo means connected to said signal generator means and responsive to said control signal to drive said spool at a rate related by an exponential function to the sensed size of said film loop.

4. In a cassette for supplying or taking up photographic film the combination comprising a light tight cassette housing, a rotatable film spool positioned in said housing, guide means located in said housing for guiding said film along a path between the exterior of said cassette and said film spool, said film in said path including at least one variable sized loop, pivotally mounted spring biased sensing roller means in contact with the film and capable of controlled movement in either one of two opposite directions for determining the size of said variable size loop, signal generator means connected to said sensing means and responsive to its movement for propagating a control signal having an amplitude related to the size of said film loop, intermittnetly operating, high speed velocity servo means connected to said signal generator means and responsive to the amplitude of said control signal to drive said spool at a rate related by an exponential function to the size of said film loop, and switch means connected to said sensing means adapted to terminate spool drive by said servo means at a predetermined size of said variable size loop.

5. In a cassette for supplying or taking up photographic film, the combination comprising a light tight cassette housing, a rotatable film spool positioned in said housing, an electric motor driving said spool, guide means located in said housing for guiding said film along a path between the exterior of said cassette housing and said film spool, said film in said path including at least one variable sized loop, sensing means in contact with the film and capable of controlled movement in either one of two opposite directions for determining the size of said variable sized loop, signal generator means connected to said sensing means and responsive to its movement for propagating a control signal having a characteristic related to the size of said film loop, control circuit means connected between said signal generator means and said motor and responsive to said control signal to cause rotation of said motor at a rate related by an exponential function to the size of said film loop, and an irreversibly operable drive train between said motor and said spool whereby said spool is rotated by said motor and said spool is prevented from rotating said motor.

6. In a cassette for taking up photographic film, the combination comprising a light tight cassette housing, a rotatable film spool positioned in said light tight cassette housing, an electric motor driving said spool, guide means located in said housing for guiding said film along a path between the exterior of said cassette and said film spool, said film in said path including at least one variable sized loop, sensing means in contact with the film and capable of controlled movement in either one of two opposite directions for determining the size of said variable size loop, signal generator means associated with said sensing means and responsive to its movement for propagating a control signal, said control signal having an amplitude related to the size of said film loop, control circuit means connected between said signal generator means and said motor and responsive to the amplitude of said control signal to cause rotation of said motor at a rate related by an exponential function to the size of said film loop, and irreversibly operable drive train means including slip clutch means connected between said motor and said spool, said slip clutch means being adapted to absorb spool energy during periods of decreasing motor speed.

7. In a cassette for supplying or taking up photographic film, the combination comprising a light tight housing, a rotatable film spool positioned in said housing, an electric motor driving said spool, spring tensioning sensing means for maintaining substantially unvarying spring tension on said film and capable of controlled movement in either one of two opposite directions for sensing the size of a loop in the film approaching said spool, signal generator means connected to said sensing means and responsive to its movement for propagating a control signal, said control signal having a characteristic related to the size of said film loop, control circuit means connected between said signal generator means and said motor and responsive to said control signal to cause motor rotation at a rate related by an exponential function to the size of said film loop, switch means connected to said sensing means and said circuit means and responsive to a predetermined size of said loop to terminate spool drive by said motor, and an irreversibly operable drive train between said motor and said spool whereby said spool is prevented from rotating said motor during periods of decreasing motor speed.

8. In a device for processing chemically developable radiation sensitive material, the combination comprising a strip of carrier web material, chemical agents applied to said carrier web material for carrying out a process operation on said radiation sensitive material, a rotatable spool for receiving said radiation sensitive material and said carrier web material, web guide means for bringing said carrier web material and said chemical agents into sandwiching engagement with the radiation sensitive surface of said radiation sensitive material at said spool, an electric motor driving said spool, sensing means for determining the size of a loop in the radiation sensitive material approaching said spool, signal generator means associated with said sensing means and adapted to propagate a control signal, said control signal having a characteristic related to the size of said film loop, and control circuit means connected between said signal generator means and said motor and responsive to said control signal to cause said motor to drive said spool at a rate related by an exponential function to the size of said loop.

9. In a device for processing photographic film, the combination comprising a strip of carrier web material, chemical agents applied to said carrier web material for carrying out a process operation on said photographic film, a rotatable spool for receiving said radiation sensitive material and said carrier web material, web guide means for bringing said carrier web material and said chemical agents into sandwiching engagement with said photographic film at said spool, said web guide means including means for maintaining substantially constant pressure and tension on said web material at the point of sandwiching engagement with said photographic film, an electric motor driving said spool, pivotally mounted spring biased sensing roller means for determining the size of a loop in the photographic film approaching said spool, signal generator means associated with said sensing means and adapted to propagate a control signal, said control signal having a characteristic related to the size of said film loop, control circuit means connected between said signal generator means and said motor and responsive to said control signal to cause motor rotation at a rate related by an exponential function to the size of said film loop, and irreversibly operable drive train means including slip clutch means connected between said motor and said spool, said slip clutch means being adapted to absorb spool energy during periods of decreasing motor speed.

10. In a device for developing photographic film, the combination comprising process material storage means, a strip of carrier web material disposed on/in said storage means, said carrier web material including photographic film developing agents applied thereto, a rotatable spool for receiving said photographic film and said carrier web material, web guide means for bringing said carrier web material and said photographic film into sandwiching engagement, whereby said developing agents are disposed on the radiation sensitive surface of said photographic film, pivotally mounted spring biased sensing roller means for determining the size of a loop in the photographic film approaching said spool, signal generating means associated with said sensing means and adapted to propagate a control signal, said control signal having an amplitude related to the size of said film loop, servo means including motor means connected between said signal generator means and said spool and responsive to the amplitude of said control signal to drive said spool at a rate related by an exponential function to the size of said film loop, and irreversibly operable drive train means including slip clutch means connected between said servo means and said spool, said slip clutch being adapted to absorb spool energy during periods of decreasing motor speed.

11. Apparatus for controlling the rate of feed of photographic film comprising a photographic film storage spool, electrically controlled drive means for said spool to cause said spool to rotate at a desired rate, guide means for said photographic film to define a film loop adjacent said storage spool, sensing means in contact with the film and capable of controlled movement in either one of two opposite directions for continually sensing the size of said film loop during operation of said apparatus, electrical signal generating means associated with said sensing means and responsive to its movement for generating an electrical signal having characteristics representative of the size of said film loop, and intermittently operating, high speed velocity servo means connected to said sensing means and to said drive means and responsive to said electrical signal to cause said film storage spool to be driven at a rate related by an exponential function to the size of said film loop.

12. Apparatus for controlling the rate of feed of photographic film comprising a photographic film storage spool, electrically controlled drive means for said spool to cause said spool to rotate at a desired rate, guide means for said photographic film to define a film loop adjacent said storage spool, said guide means including a spring biased movable guide roller in contact with the film and capable of controlled movement in either one of two opposite directions for continually sensing the size of said film loop during operation of said apparatus, potentiometer means responsive to the movement of said guide roller for generating an electrical signal having characteristics representative of the size of said film loop, and intermittently operating, high speed velocity servo means connected to said sensing means and to said drive means and responsive to said electrical signal to cause said film storage spool to be driven at a rate related by an exponential function to the size of said film loop.

References Cited in the file of this patent

UNITED STATES PATENTS

| | | |
|---|---|---|
| 2,422,651 | Ayers | June 24, 1947 |
| 2,497,208 | Coggeshall | Feb. 14, 1950 |
| 2,559,770 | Johnson | July 10, 1951 |
| 2,666,594 | Jungjohann | Jan. 19, 1954 |
| 2,718,361 | Evraets | Sept. 20, 1955 |
| 2,785,260 | Matthew | Mar. 12, 1957 |
| 2,835,773 | Sawyer et al. | May 20, 1958 |
| 2,985,396 | Johnson | May 23, 1961 |
| 2,990,484 | Jones | June 27, 1961 |
| 3,041,952 | Schreck | July 3, 1962 |